(12) United States Patent
Saleh et al.

(10) Patent No.: US 9,253,747 B1
(45) Date of Patent: Feb. 2, 2016

(54) AUTOMATIC PRE-REGISTRATION IN RESPONSE TO EARLIER RELEASE AND REDIRECT

(71) Applicant: Sprint Spectrum L.P., Overland Park, KS (US)

(72) Inventors: Ahmad N. Saleh, Overland Park, KS (US); Kristin A. Hayne, Overland Park, KS (US); Jose L. Hernandez, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/533,365

(22) Filed: Nov. 5, 2014

(51) Int. Cl.
*H04W 4/00* (2009.01)
*H04W 60/04* (2009.01)
*H04W 36/14* (2009.01)
*H04W 36/00* (2009.01)

(52) U.S. Cl.
CPC .......... *H04W 60/04* (2013.01); *H04W 36/0066* (2013.01); *H04W 36/14* (2013.01)

(58) Field of Classification Search
CPC ........ H04W 60/00; H04W 48/18; H04W 8/12
USPC .................... 455/435.1, 535.2, 433
See application file for complete search history.

(56) References Cited

U.S. PATENT DOCUMENTS

| | | | |
|---|---|---|---|
| 2009/0161630 A1* | 6/2009 | Tachibana | 370/331 |
| 2010/0182020 A1* | 7/2010 | Thornley et al. | 324/691 |
| 2010/0304737 A1* | 12/2010 | Jain et al. | 455/426.1 |
| 2012/0051328 A1* | 3/2012 | Swaminathan | 370/332 |
| 2012/0127960 A1* | 5/2012 | Lei | 370/332 |
| 2013/0230024 A1* | 9/2013 | Lim et al. | 370/331 |
| 2014/0016490 A1* | 1/2014 | Tabet et al. | 370/252 |

* cited by examiner

*Primary Examiner* — Danh Le (57) ABSTRACT

Disclosed is a method and corresponding system for managing CSFB pre-registration. A first network serving a UE releases the UE from being served by the first network and redirects the UE to transition from being served by the first network to being served by a second network. The first network then detects that the UE has returned to be served by the first network. In response to detecting the return of the UE, and based on the previous releasing and redirecting of the UE, the first network then initiates a pre-registration of the UE with the second network to inform the second network that the UE is now reachable via the first network.

19 Claims, 4 Drawing Sheets

AUTOMATIC PRE-REGISTRATION IN RESPONSE TO EARLIER RELEASE AND REDIRECT

BACKGROUND

Unless otherwise indicated herein, the description provided in this section is not itself prior art to the claims and is not admitted to be prior art by inclusion in this section.

A typical radio access network (RAN) includes one or more base stations that radiate to define one or more wireless coverage areas, such as cells and cell sectors, in which user equipment devices (UEs) such as cell phones, tablet computers, tracking devices, embedded wireless modules, and other wirelessly equipped communication devices, can operate. Further, each base station of the RAN may then be coupled or communicatively linked with network infrastructure such as a switch or gateway that provides connectivity with one or more transport networks, such as the public switched telephone network (PSTN) and/or the Internet for instance.

With this arrangement, a UE within coverage of the RAN may thus engage in air interface communication with the base station and thereby communicate via the base station with various remote network entities or with other UEs served by the base station.

In general, a RAN may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1 xRTT and 1xEV-DO), Global System for Mobile Communication (GSM), WI-FI, and BLUETOOTH. Each protocol may define its own procedures for registration of UEs, initiation of communications, handoff between coverage areas, and functions related to air interface communication.

When a UE enters into coverage of a RAN, the UE may detect a reference signal and read system information broadcast from a base station and may then engage in a process to register itself to be served by the RAN. For instance, the UE may transmit an attach message on an uplink control channel to the base station, and the base station and/or supporting infrastructure may then responsively authenticate and authorize the UE for service and establish a record indicating where in the RAN the UE is operating and provide an attach accept message to the UE. Thereafter, the UE may then be served by the RAN in an idle mode or a connected/active mode. In the idle mode, the UE may monitor a downlink control channel to detect page messages and other information regarding incoming communications and may similarly transmit uplink control signaling to initiate communications or for other reasons. In the connected/active mode, the UE may have particular traffic channel resources assigned by the RAN, which the UE may use to engage in communication of bearer traffic and the like.

A communications system may accommodate multiple RANs, such as CDMA networks, LTE networks, and wireless Local Area Networks (wireless LANs), in a partially or fully integrated manner. Further, the communication system may provide for UE mobility among such RANs. This mobility may allow for transmission, reception, and continuous communication even when the UE moves from one RAN to another.

Overview

Certain RAN technologies, such as LTE, may provide communication services using the Internet Protocol (IP), possibly without existing circuit-switched domain functions. Accordingly, services like voice calls that have traditionally been provided over the circuit-switched domain may be replaced by Voice Over Internet Protocol (VOIP), for example. This may include deployment of an IP Multimedia Subsystem (IMS) as a service control platform. The IMS may refer to a communications system that integrates services provided by circuit-switched technology with packet-switched technologies such as the Session Initiation Protocol (SIP), the Media Gateway Control Protocol (MGCP), the Real-time Transport Protocol (RTP), etc.

However, it may take some time before LTE RANs, IMS, and/or VOIP services can be provided in all coverage areas. Even if VOIP is available for an LTE-capable UE, it may still be desirable to use voice capabilities of a fallback RAN to conduct some voice calls. For instance, it may be desirable to use a CDMA RAN as a fallback RAN to conduct voice calls, because of the extensive CDMA infrastructure that is already deployed and because circuit-switched CDMA voice is a well understood and reasonably reliable technology. It should be understood that CDMA and LTE are used herein as examples for illustration only; as such, other network protocols or standards such as WI-FI, GSM, WiMAX, EV-DO, GSM, and Wideband CDMA (WCDMA) standards can be used instead or as well. Further, various proprietary technologies and protocols can also be used.

Thus, UEs that are both CDMA- and LTE-capable may be configured to switch from an LTE RAN to a CDMA RAN when originating or receiving voice calls. This switching function, referred to as "Circuit-Switched Fallback," (CSFB), or "enhanced Circuit-Switched Fallback" (eCSFB), enables voice services for CDMA- and LTE-capable UEs using existing circuit-switched CDMA infrastructure. Herein, a UE that is capable of switching between a given RAN and a fallback RAN is referred to as a CSFB-capable UE.

In general, when a CSFB-capable UE attaches with an LTE RAN, the UE will then engage in pre-registration via the LTE RAN with a fallback CDMA RAN (e.g., transmitting an Info Transfer message encapsulating a 1xRTT registration request), which will result in the fallback RAN updating a reachability record stored at the fallback RAN for the UE to indicate that the UE is reachable via the LTE RAN. That way, when the fallback network has a call to connect to the UE, the fallback RAN would trigger paging of the UE via the LTE RAN.

CSFB standards differ from eCSFB standards in handling pre-registration of the UE with the fallback network. According to CSFB standards, when a UE that is attached to an LTE RAN and has pre-registered with a fallback RAN is going to engage in a CSFB call (mobile originated or mobile terminated), the LTE RAN will "release-and-redirect" the UE. Releasing and redirecting the UE will cause the UE to detach from LTE RAN and to move over to scan for and directly register with the fallback RAN so as to place or receive the call. This direct registration results in change of the reachability record that the fallback network stores for the UE, to show that the UE is now reachable directly via the fallback RAN. When the UE finishes the call served by the fallback RAN, the UE then returns to the LTE RAN, and newly attaches with LTE RAN. The UE then engages in pre-registration via the LTE RAN with the fallback RAN once again, so as to update the reachability record for the UE to show that the UE is now reachable via the LTE RAN again. Such pre-registration via the LTE RAN with the fallback RAN involves the UE exchanging registration signaling with the LTE RAN. For instance, the UE may transmit, on uplink air interface resources, a registration request or attach request to the LTE RAN. The LTE RAN may process the registration and transmit, on downlink air interface resources, a registration acknowledgement message. Consequently, pre-registration of the UE with the fallback RAN via the LTE RAN involves use of air-interface resources (e.g., a particular air-interface channel, timeslots, or resource blocks) of the LTE RAN so as to facilitate the exchanging of registration signaling with the UE.

According to eCSFB standards, on the other hand, when a UE that is attached to the LTE RAN and has pre-registered with a fallback RAN is going to engage in a CSFB call, the fallback RAN assigns a traffic channel for the UE, and a message specifying that traffic channel assignment passes to the UE via the LTE RAN. The UE then detaches from the LTE RAN and transitions to operate on the assigned fallback RAN traffic channel so as to engage in the call. When the UE finishes the call served by the fallback RAN, the UE then returns to the LTE RAN and newly attaches with the LTE RAN. But the UE need not again engage in pre-registration with the fallback RAN in this case, since the reachability record for the UE has not been changed, because the UE did not directly register with the fallback RAN, but rather remains registered with the fallback RAN via the LTE network.

In some cases, however, the eCSFB mechanism will not work or will not be provided, and so the CSFB mechanism is used instead. Thus, the UE will need to pre-register with the fallback RAN when the UE returns to the LTE RAN. Indeed, it is likely that many CSFB calls may be handled with the CSFB mechanism rather than the eCSFB mechanism. Consequently, there may be many repeat UE pre-registrations as UEs return to the LTE RAN following CSFB calls. These pre-registrations may burden the LTE RAN air-interface as the LTE RAN allocates resources to the UEs to facilitate the CSFB pre-registration, as mentioned above. Consequently, an improvement is desired.

Disclosed herein is a method and corresponding system for an enhanced management of CSFB pre-registration. In accordance with the disclosure, when an LTE RAN performs a release-and-redirect to facilitate CSFB service by a fallback RAN for a UE, the LTE RAN will store a record of that fact. When the UE then returns to the LTE RAN network after the UE finishes engaging in CSFB service, the LTE RAN will detect the previously stored record of the release-and-redirect and, responsive to the previously stored record, will autonomously pre-register the UE with fallback network, rather than the UE itself having to send a pre-registration message via the LTE RAN at that point. The LTE network's autonomous pre-registration of the UE with the fallback RAN will result in updating the reachability record that the fallback network stores for the UE to note that the UE is now reachable by the fallback RAN via the LTE RAN. Advantageously this process may thereby help to manage air interface capacity by reducing the extent of pre-registration messaging between the UEs and the LTE RAN.

Accordingly, in one respect, disclosed is a method. The method may involve (i) a first network that is serving a UE releasing the UE from being served by the first network and redirecting the UE to transition from being served by the first network to being served by a second network, (ii) thereafter, the first network detecting that the UE has returned to be served by the first network, and (iii) responsive to detecting the return of the UE, and based on the previous releasing and redirecting of the UE, the first network initiating a pre-registration of the UE with the second network to inform the second network that the UE is now reachable via the first network.

In another respect, the disclosed method may involve (i) a first network that is serving a UE releasing the UE from being served by the first network, redirecting the UE to transition from being served by the first network to being served by a second network, and storing information indicative of the releasing and redirecting of the UE, (ii) thereafter, the first network detecting that the UE has returned to be served by the first network, (iii) responsive to detecting the return of the UE, the first network referring to the stored information to determine that the first network previously released and redirected the UE, and (iv) responsive to determining that the first network previously released and redirected the UE, the first network autonomously initiating a pre-registration of the UE with the second network to inform the second network that the UE is now reachable via the first network.

Further, disclosed is a communication system that comprises a first network, and a second network. The first network is configured to: (i) serve a UE, (ii) release the UE from being served by the first network and redirect the UE to transition from being served by the first network to being served by a second network, (iii) thereafter, detect that the UE has returned to be served by the first network, and (iv) responsive to detecting the return of the UE, and based on the previous releasing and redirecting of the UE, autonomously initiate a pre-registration of the UE with the second network to inform the second network that the UE is now reachable via the first network. Further, the second network is configured to: (i) receive signaling from the UE upon the releasing and redirecting of the UE, (ii) responsive to receiving the signaling, update a record that the second network stores for the UE to indicate that the UE is reachable directly via the second network, (iii) thereafter, receive a pre-registration request, and (iv) responsive to the pre-registration request, update the record of the UE to indicate that the UE is now reachable via the first network.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of a hybrid LTE/CDMA communication system like that discussed above. However, it should be understood that principles described herein can apply as well in numerous other contexts, such as in numerous other RAN arrangements, and with various other protocols or combination of protocols. Further, it should be understood that the various arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

As noted above, FIG. 1 is a simplified block diagram of the example system, including an LTE RAN 12 and a CDMA RAN 14. In the example system, the LTE RAN primarily serves UEs with wireless packet data communication service. Whereas the CDMA RAN primarily serves UEs with wireless circuit-switched voice call service but may also provide packet-data communication service and other types of service. These RANs may be owned or operated by a common wireless service provider, which may enable the provider to serve UEs with high speed packet data service through the LTE RAN and traditional cellular voice call service through the CDMA RAN.

Figure 1:
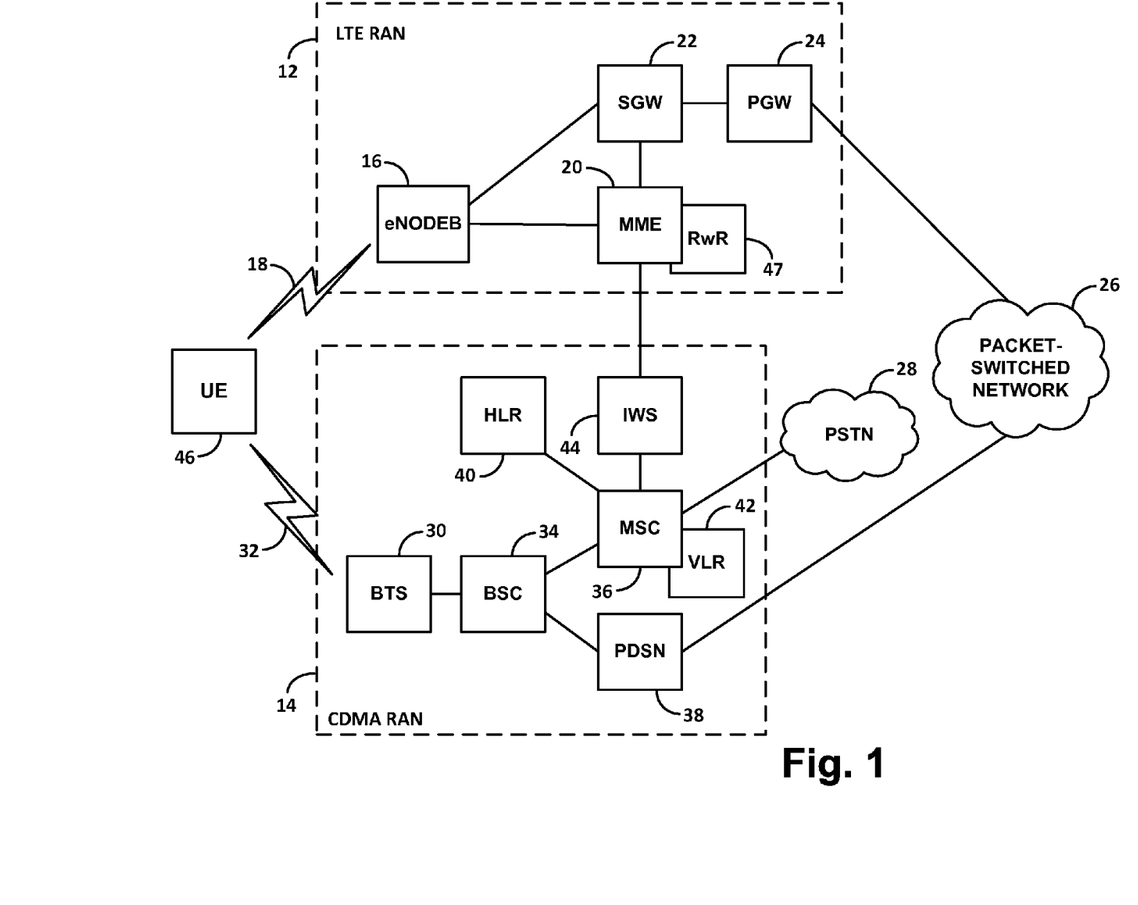
FIG. 1 is a simplified block diagram of a network arrangement in which aspects of the present disclosure can be implemented.

The LTE RAN 12 in the example system is shown including a representative LTE base station 16 known as an eNodeB, which includes an antenna structure and associated equipment for providing an LTE coverage area 18 in which UEs can be served by the eNodeB and thus by the LTE RAN. The eNodeB is then shown having a communication interface with a mobility management entity (MME) 20 that functions as a signaling controller for the LTE RAN. Further, the eNodeB is also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN may sit as nodes on a private packet-switched network owned by an operator of the LTE RAN, and thus the various communication interfaces may be logical interfaces through that network.

The CDMA RAN 14, on the other hand, is shown including a representative CDMA base station 30 known as a base transceiver station (BTS), which includes an antenna structure and associated equipment for providing a CDMA coverage area 32 in which UEs can be served by the BTS and thus by the CDMA RAN. The BTS is then shown in communication with a base station controller (BSC) 34, which is in turn shown in communication with a mobile switching center (MSC) 36 that provides connectivity with the PSTN 28 and in communication with a packet data serving node (PDSN) 38 that provides connectivity with the packet-switched network 26.

The CDMA RAN in the example system is shown including a Home Location Register (HLR) 40. The HLR may include or have access to a central database that holds data regarding each UE that is authorized to use the CDMA RAN. The HLR may be connected to the MSC, for example, and may be configured to support mobility-related aspects of UE services, including dynamic tracking of UE registration location and verification of service privileges for the UE. For instance, the HLR may contain records for UEs subscribed to the CDMA RAN, and may store or have access to identifying information of those UEs. This identifying information may include, but is not limited to, network access identifiers (NAIs), mobile directory numbers (MDNs), mobile identification numbers (MINs), international mobile subscriber identifiers (IMSIs), electronic serial numbers (ESNs), international mobile equipment identifiers (IMEIs), and/or mobile equipment identifiers (MEIDs). Any of these types of UE identifiers, or other data, may be used to identify UEs subscribed to the CDMA RAN.

Further, the CDMA RAN is shown including a Visitor Location Register (VLR) 42. The VLR may include or have access to a database of UEs that have entered into a service area of the MSC. Each MSC in the CDMA RAN may have its own VLR that keeps track of UEs that are operating in, or have recently operated in, the areas controlled by that MSC. The VLR may be attached to, or be a part of, the MSC as conceptually depicted in FIG. 1. Alternatively, the VLR may be remote from the MSC.

The VLR may comprise one or more registers that contain data regarding the UEs that are operating in the service area of the MSC. The data regarding the UEs may include identifying information (e.g., NAIs, MDNs, MINs, IMSIs, ESNs, IMEIs, and/or MEIDs) and required information for procedures such as authentication and call setup.

The VLR also includes reachability information or a reachability flag for each UE. The reachability information may indicate, for instance, a location of the UE or a particular coverage area where the UE is registered. The reachability information may also indicate a particular network path that the CDMA RAN can use to reach (e.g., page or send a message to) the UE. For instance, the network path may indicate which BSC and BTS can be used to reach the UE at a given time. The MSC and the BSC may thus use the data contained in the VLR to direct a communication (e.g., a voice call or a text message) to one or more base stations servicing the UEs to which that communication is addressed.

In a further aspect, each UE has a service profile record stored in the HLR and/or the VLR. The service profile record of the UE may include the service policy rules for the UE. Thus, the service profile record may indicate the various service policy rules and applicable triggers and parameters of each rule, such as indications of when the rules should apply and what the rules involve. For example, the service profile may specify various communication services or applications that the UE is entitled to use, such as whether the UE is entitled to engage in PSTN voice call communication and/or Internet data communication. As another example, the service profile record may list various access control rules for the UE, such as particular network addresses that the UE is not entitled to contact. And as another example, the service profile record may specify particular time of day restrictions on these or other rules.

As depicted in FIG. 1, the MSC is coupled to the HLR or the VLR, and may thus access the service profile record for the UE using an identifier for the UE, such as its MIN, MDN, and/or IMSI. The MSC is configured to serve the UE according to the service profile record. For instance, the MSC may be configured to apply the policy rules of the service profile record as the MSC serves the UE.

Further shown in FIG. 1 is an interworking server (IWS) 44, which serves as a signaling intermediary between the LTE RAN and the CDMA RAN to facilitate functions such as CSFB or eCSFB. The IWS may be provided as an element of either one of the RANs or as an element separate from but connected to each RAN, and in a representative arrangement as shown has a communication interface with the MME of the LTE RAN on one hand and a communication interface with the MSC of the CDMA RAN on the other hand. In an example configuration, the IWS may be integrated with the MSC of the CDMA RAN. But other arrangements are possible as well.

FIG. 1 illustrates a UE 46 located within both coverage area 18 of the LTE RAN and coverage area 32 of the CDMA RAN. This UE is a hybrid telephony device (e.g., cell phone or other such device), equipped to support both LTE service and CDMA service and is thus capable of being served by both the LTE RAN and the CDMA RAN and engaging in voice calls served the LTE RAN and voice calls served by the CDMA RAN.

In practice, the UE is configured to give preference to being served by the LTE RAN. Thus, when the UE enters a particular area with coverage of the LTE RAN, even if CDMA coverage exists in that particular area, the UE attaches to the LTE RAN.

To attach to the LTE RAN, the UE may be configured to transmit, on uplink air interface resources in a particular coverage area, an LTE registration request or attach request. The serving eNodeB and associated equipment may process the registration and transmit, on downlink air interface resources, an LTE registration acknowledgement message.

Further, the UE may maintain or have access to a tracking area identifier list (a "TAI list"), which indicates the tracking area or areas in which the UE is currently registered. Accordingly, when the UE enters a tracking area in which it is not currently registered, it may implement a zone-update process to register in the new tracking area. Specifically, when the UE attaches to the LTE RAN, the UE may start a tracking-area update procedure by sending the tracking area update request message to the LTE RAN (e.g., via an eNodeB to an MME or another LTE RAN entity). The request message may indicate a Globally Unique Temporary ID (GUTI) that identifies the particular UE, as well as the TAI list for the UE. If the MME receives a tracking area update request, the MME may then send a tracking area update accept message to the UE. The tracking area update accept message may include a new GUTI and/or an updated TAI list, if either has changed. In turn, the UE may then send the MME a tracking area update complete message.

Thus, referring to FIG. 1, upon entry into coverage area 18 of the LTE RAN, even though CDMA coverage exists there too, the UE attaches with eNodeB 16 by engaging in attach signaling with the eNodeB and the MME (i.e., transmitting an LTE attach request and a tracking area update, and receiving an LTE registration acknowledgement message and a tracking area update accept message).

Further, in normal operation with this arrangement, when the UE attaches with the eNodeB, the UE then engages in pre-registration with the CDMA network via the eNodeB, the MME, and the IWS. For instance, the UE may transmit an Info Transfer message encapsulating a 1xRTT registration request via the eNodeB, the MME, and the IWS to the MSC of the CDMA RAN. The MSC may then send a registration response message via the IWS, the MME, and the eNodeB to the UE. When the UE pre-registers with the CDMA RAN, the CDMA RAN (e.g., the MSC) updates the reachability information in the VLR record stored at the CDMA RAN for the UE to indicate that the UE is reachable via the LTE RAN (i.e., reachable via the IWS, MME, and eNodeB). That way, when the CDMA RAN has a call to connect to the UE, the CDMA RAN would trigger paging of the UE via the LTE RAN.

In this manner, the UE performs two registrations: a first registration with the LTE RAN, and a second registration with the CDMA RAN via the LTE RAN. This second registration of the UE with the CDMA via the LTE RAN involves exchanging pre-registration messages between the UE and the LTE RAN (i.e., the eNodeB and the MME of the LTE RAN) and thus the use of LTE RAN resources to communicate with the UE. The LTE RAN has a limited number of resources, and repeated pre-registrations by UEs may therefore deplete the LTE RAN resources and affect service provided by the LTE RAN. For instance, such depletion of LTE RAN resources may cause service to some UEs to fail since there may be no resources available to assign to such UEs.

In the example arrangement of FIG. 1, CSFB standards, rather than eCSFB standards, apply. Further, the LTE RAN (e.g., eNodeB 16, MME 20, and/or one or more other entities of the LTE RAN) is normally configured to support providing CSFB, such as with each involved component of the LTE RAN being programmed with control logic to cause the component to carry out certain CSFB related functions. With this configuration, for instance, when a UE that is being served by the eNodeB seeks to place a voice call, the UE may transmit an extended service request message to the eNodeB, the eNodeB may pass that message along to the MME, and the MME may pass that message via the IWS to the MSC, to facilitate setup of the requested call by the CDMA RAN. And likewise, when the MSC of the CDMA RAN has a voice call to connect to the UE and sends a CSFB page message via the IWS to the MME of the LTE RAN, the MME may responsively cause the eNodeB to page the UE, and the eNodeB, MME, and IWS may handle additional CSFB related signaling to facilitate setup of the CSFB call.

With this CSFB process, whether the UE seeks to place a call or is receiving a call, the LTE RAN may thus release the UE to detach the UE from the LTE RAN, and redirect the UE to move over to scan for and directly register with the CDMA RAN so as to place or receive the call. This process of releasing the UE to detach the UE from the LTE RAN and redirecting the UE by the LTE RAN to directly register with the CDMA RAN may be referred to as a "release-and-redirect" procedure. Further, the process may involve the following example steps. If the UE receives a call while the UE is attached to the eNodeB of the LTE RAN, the MSC sends a message via the IWS to the MME, and the MME then sends a paging message to the UE to indicate Circuit-Switched (CS) paging. The UE then sends an Extended Service Request (ESR) message to the MME with a CSFB indicator. If the UE seeks to place a call while the UE is attached to the eNodeB, the UE sends the ESR message to the MME with a CSFB indicator.

In order to send this ESR message to the MME, the UE first works with the eNodeB to establish a radio-link layer connection through which the UE can send the ESR message. In particular, the UE first sends to the eNodeB an access request seeking to gain access to communicate with the eNodeB, and the eNodeB then sends to the UE an access response. Upon receipt of the access response, the UE then sends to the eNodeB a Radio Resource Control (RRC) Connection request seeking establishment of an RRC connection, and the eNodeB grants the request, thereby establishing an RRC connection as a radio-link layer connection between the UE and the eNodeB. With that RRC connection established, the UE then requests the eNodeB to allocate uplink traffic channel resources for use by the UE to transmit an ESR, and the eNodeB responsively allocates uplink resources for that purpose. And the UE then uses the allocated uplink resources to transmit the ESR, which the eNodeB passes along to the MME.

With the example release-and-redirect process, in response to the Extended Service Request message, the MME sends a message to the eNodeB containing the CSFB indicator. The eNodeB then sends an RRC Connection Release message to the UE with information about Broadcast Control Channel (BCCH) carrier frequency(ies) on which the UE should search for a suitable BTS of the CDMA RAN. Upon receiving this message, the UE releases the established RRC Connection with the LTE RAN and operates in RRC idle mode. Once in RRC idle mode, the UE tunes its radio to search for BTSs of the CDMA RAN over the CDMA RAN BCCH carrier frequencies provided in the LTE RRC Connection Release message. Once the UE finds a BTS of the CDMA RAN on a particular frequency of the BCCH carrier frequencies, the UE directly registers with the BTS. The UE searching for BTSs over the BCCH carrier frequencies and direct registration with a particular BTS of the CDMA RAN may be considered a completion of the "release-and-redirect" procedure.

The UE's direct registration with the BTS involves the UE sending a registration message to the BTS, the message passing to the MSC, and the MSC sending a registration notification (REGNOT) to an HLR contained in the CDMA RAN. The HLR then responds with a registration notification return result (regnot_rr), providing the MSC with a copy of the UE's service profile record, for storage in a VLR record for the UE so as to enable the MSC to serve the UE in accordance with the provisions of the service profile record.

Further, the MSC updates the reachability information in the VLR record to indicate which BTS of the CDMA RAN is serving the UE, so that when the MSC pages the UE to initiate call establishment, the MSC can do so via that particular BTS.

In the CSFB process, when the UE finishes the call served by the CDMA RAN, the UE seeks to return to the LTE RAN. The UE thus transmits a new LTE attach request to the eNodeB and a tracking area update via the eNodeB to the MME. In response to transmitting the new attach request and tracking area update, the UE receives an LTE registration acknowledgement message and a tracking area update accept message. The UE then engages in pre-registration signaling, via the MME and the IWS, with the MSC of the CDMA RAN once again. The MSC then updates the reachability information in the VLR record that the CDMA RAN stores for the UE to indicate that the UE can be reached via paging through the IWS to the MME to an eNodeB to the UE, rather than through direct paging by the BTS.

As noted above, however, the pre-registration signaling would burden the air interface of the LTE RAN, because the pre-registration involves the UE exchanging messages with the LTE RAN, and consequently involves the use of LTE RAN air-interface resources. Extensive burdening of the LTE RAN air interface may cause service to some UEs to fail since there may be no resources available to assign to such UEs as described above.

The disclosed method may advantageously help prevent such burdening the LTE RAN air interface by avoiding excessive pre-registration messaging between the UEs and the LTE RAN after calls conducted according to CSFB standards. Specifically, when the LTE RAN performs a release-and-redirect procedure for the UE to facilitate CSFB service for a UE, the LTE RAN will store a record of that fact. When the UE then returns to the LTE RAN network after the UE finishes engaging in CSFB service, the LTE RAN will detect the previously stored record of the release-and-redirect of the UE and, responsive to the previously stored record, will autonomously pre-register the UE with fallback network, rather than the UE itself having to send a pre-registration message via the LTE RAN at that point. Avoiding the UE itself having to send the pre-registration message via the LTE RAN may help manage the LTE RAN air interface resources by reducing the extent of pre-registration messaging between the LTE RAN and UEs.

Particularly, in an example implementation of the present method, when the eNodeB decides to release the UE to enable the UE to perform a CSFB fallback to the CDMA RAN, the eNodeB sends a 'Notification Message' to the MME, informing the MME that this specific UE will be using CSFB (rather than eCSFB) as the fallback mechanism to handle voice call service. Once the MME receives the 'Notification Message', the MME records the fact that the UE is being or has been released from the LTE RAN and redirected to the CDMA RAN. For instance, the MME may record the release-and-redirect of the UE in a release-with-redirect (RwR) database 47 illustrated in FIG. 1. In an example implementation, the MME may record the release-and-redirect of the UE as a flag that indicates the fact that the UE has been released and redirected by the LTE RAN. Other methods of recording the fact of the release-and-redirect could be used as well.

After the UE finishes engaging in CSFB service (e.g., finishes a call served by the CDMA RAN), the UE detaches from the CDMA RAN, and then reattaches with LTE RAN. Reattaching with the LTE RAN involves the UE sending a new LTE attach request and a tracking area update request to the LTE RAN, and in response receiving an LTE registration acknowledgement message from the eNodeB of and a tracking area update accept message from the MME.

When the MME receives the tracking area update request, the MME registers the UE on the LTE RAN. The tracking area update request may also trigger the MME to search the RwR database, or other records, to detect whether there is a record of a previous release-and-redirect for the UE. If the MME detects a release-and-redirect record in the RwR database, the MME will autonomously pre-register the UE with the CDMA RAN, rather than the UE itself having to send a pre-registration message. As an example, the MME may send a "VLR Flag Change Request" via the IWS, and the IWS communicates the VLR Flag Change Request to the MSC of the CDMA RAN. In this example, in response to receiving the VLR Flag Change Request, the MSC updates the reachability information in the VLR record that the CDMA RAN stores for the UE to note that the UE is now reachable by the CDMA RAN via the LTE RAN (i.e., via the IWS, the MME, and the eNodeB). On the other hand, if the MME does not detect a release-and-redirect record in the RwR database, the MME may not autonomously register the UE with the pre-register the UE with the CDMA RAN. Rather, the UE itself may send a pre-registration message via the LTE RAN to the CDMA RAN so as to update the reachability record for the UE to show that the UE is now reachable via the LTE RAN again.

The RwR database may be configured to keep the record of the release-and-redirect for a predetermined period of time. For instance, the MME may record the release-and-redirect of the UE as a temporary flag in the RwR database. The RwR database may keep the temporary flag active for a given period of time (e.g., 30 minutes). Thereafter, the MME may clear the temporary flag from the RwR database. For example, the MME may clear the flag upon or after initiating pre-registration of the UE with the CDMA RAN on behalf of the UE. By clearing the flag, the MME may avoid erroneously applying an outdated release-and-redirect record at a later time.

As an alternative to the MME carrying out these functions, the eNodeB itself could maintain a record of the fact that the eNodeB communicated release-and-redirect signaling to the UE (i.e., the eNodeB could maintain the RwR database). When the UE returns to the LTE RAN after finishing CSFB service on the CDMA RAN, the UE sends a new attach request to the eNodeB of the LTE RAN. Such an attach request may trigger the eNodeB to search the RwR database for a record of a previous release-and-redirect of the UE from the LTE RAN to the CDMA RAN. If the record is found, the eNodeB could then autonomously generate a registration notification with the CDMA RAN on behalf of the UE. As another alternative to the MME or the eNodeB, the IWS may be configured to maintain the RwR database and carry out these functions to register the UE with the CDMA RAN on behalf of the UE.

Advantageously, this process may thereby help to manage air interface capacity of the LTE RAN by avoiding excessive pre-registration messaging between the UEs and the LTE RAN after calls conducted according to CSFB standards.

Figure 2:
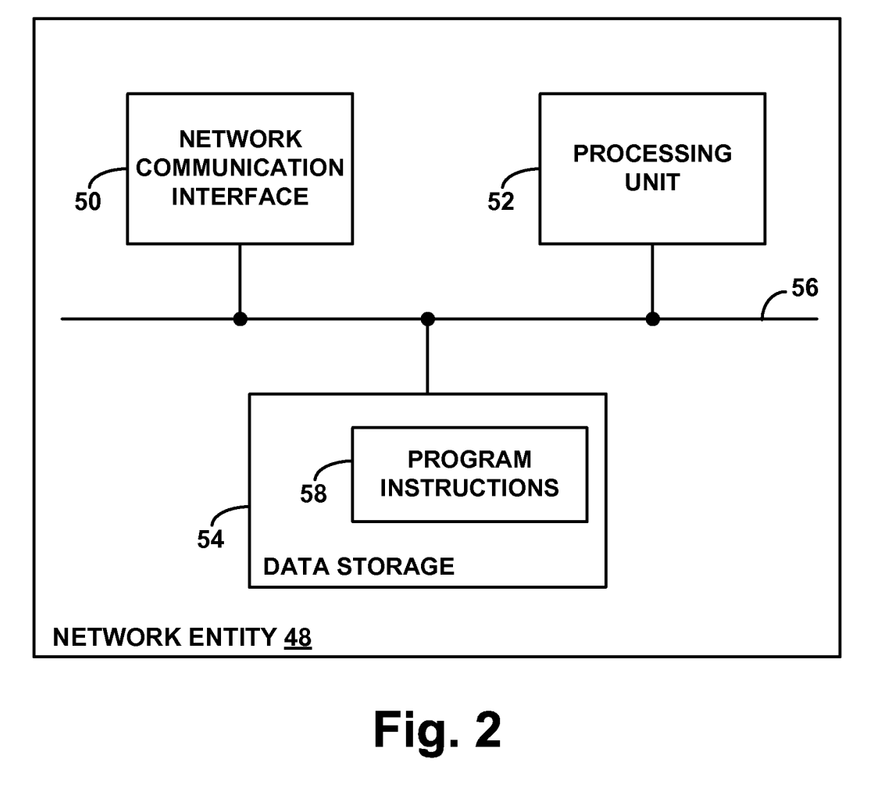
FIG. 2 is a simplified block diagram of a network server operable in the arrangement of FIG. 1.

FIG. 2 is next a simplified block diagram of an example network entity 48, showing some of the components that may be included in such an entity to facilitate carrying out functions of the present method. The network entity 48 could represent, for example, MME 20. As shown in FIG. 2, the network entity 48 includes a network communication interface 50, a processing unit 52, and non-transitory data storage 54, all of which may be communicatively linked together by a system bus, network, or other connection mechanism 56. Further, although these components are shown as discrete blocks in the figure, in practice the components could be integrated together in various ways and/or distributed, replicated, or arranged in some other manner.

Network communication interface 50 may function to facilitate communication with various other entities of the LTE RAN, entities of the CDMA RAN, and UEs such as UE 46. For example, if network entity 48 represents the MME of the LTE RAN, the network communication interface facilitates communication between the MME and eNodeB 16, SGW 22, IWS 44, UE 46, etc. As such, the network communication interface 50 may include one or more network communication interface modules, such as Ethernet network communication interface modules for instance, or may take any of a variety of other forms, supporting wireless and/or wired communication according to any of a variety of network communication protocols.

Processing unit 52 may then comprise one or more general purpose processors (such as microprocessors) and/or one or more special purpose processors (e.g., application specific integrated circuits). And data storage 54 may comprise one or more volatile and/or non-volatile storage components, such as optical, magnetic, or flash storage. As shown, data storage 54 may hold program instructions 58 that are executable by processing unit 52 to carry out various functions described herein, to manage CSFB pre-registration.

As such, the program instructions 58 may include instructions that are executable by the processing unit to (i) release a UE from being served by a first network and redirect the UE to transition from being served by the first network to being served by a second network, (ii) thereafter, detect that the UE has returned to be served by the first network, and (iii) responsive to detecting the return of the UE, and based on the previous releasing and redirecting of the UE, initiate a pre-registration of the UE with the second network to inform the second network that the UE is now reachable via the first network. Further, the instructions may be executable by the processing unit to carry out various other functions as described herein.

Figure 3:
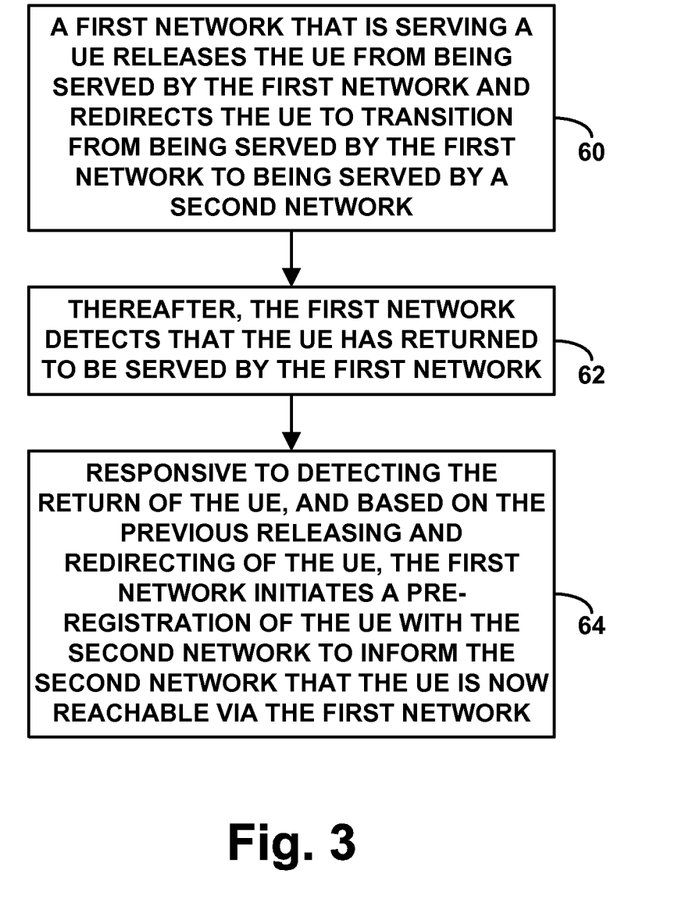
FIG. 3 is a flow chart depicting functions that can be carried out in accordance with the present disclosure.

FIG. 3 is next a flow chart depicting functions that can be carried out in accordance with an example of the present method, to manage CSFB pre-registration. As shown in FIG. 3, at block 60, the functions include a first network that is serving a user equipment device (UE) releasing the UE from being served by the first network and redirecting the UE to transition from being served by the first network to being served by a second network. For instance, the first network could be an LTE RAN, and the second network could be a fallback RAN, such as a CDMA RAN. In response to the transition of the UE from being served by the first network to being served by the second network, the second network may update a record that the second network stores for the UE such that the record indicates that the UE is reachable directly via the second network. At block 62, the functions further include, thereafter, the first network detecting that the UE has returned to be served by the first network. And at block 64, the functions include, responsive to detecting the return of the UE, and based on the previous releasing and redirecting of the UE, the first network initiating a pre-registration of the UE with the second network to inform the second network that the UE is now reachable via the first network. In line with the discussion above, the first network may initiate the pre-registration autonomously rather than in response to receipt from the UE of a request to register with the second network. Further, initiating the pre-registration of the UE with the second network may result in updating the record that the second network stores for the UE to inform the second network that the UE is now reachable via the first network.

Figure 4:
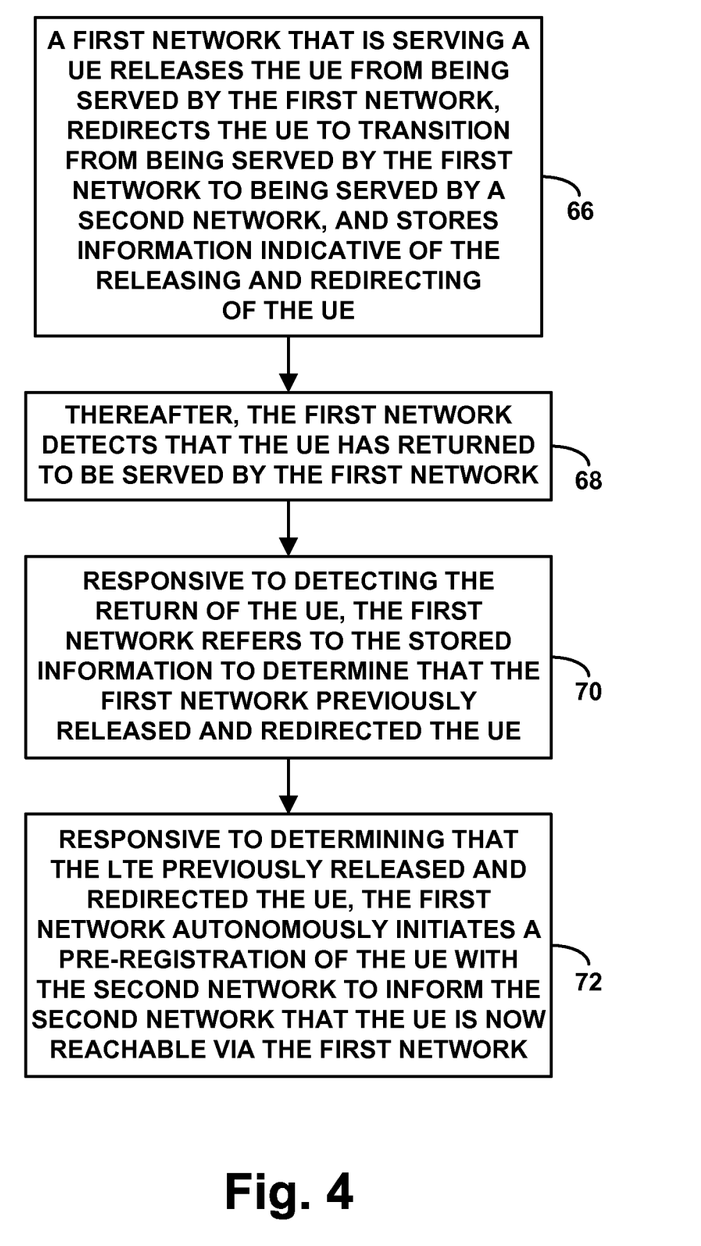
FIG. 4 is another flow chart depicting functions that can be carried out in accordance with the present disclosure.

Finally, FIG. 4 is another flow chart depicting functions that can be carried out in accordance with an example of the present method, to manage CSFB pre-registration. As shown in FIG. 4, at block 66, the functions include a first network that is serving a UE releasing the UE from being served by the first network, redirecting the UE to transition from being served by the first network to being served by a second network, and storing information indicative of the releasing and redirecting of the UE. At block 68, the functions include, thereafter, the first network detecting that the UE has returned to be served by the first network. At block 70, the functions also include, responsive to detecting the return of the UE, the first network referring to the stored information to determine that the first network previously released and redirected the UE. And at block 72, the functions then further include, responsive to determining that the LTE previously released and redirected the UE, the first network autonomously initiating a pre-registration of the UE with the second network to inform the second network that the UE is now reachable via the first network.

Exemplary embodiments have been described above. Those skilled in the art will understand, however, that changes and modifications may be made to these embodiments without departing from the true scope and spirit of the invention.

We claim:
1. A method comprising:
a first network that is serving a user equipment device (UE) releasing the UE from being served by the first network, redirecting the UE to transition from being served by the first network to being served by a second network, and storing information indicative of the releasing and redirecting of the UE;
thereafter, the first network detecting that the UE has returned to be served by the first network; and
responsive to detecting the return of the UE: (i) the first network referring to the stored information to determine that the first network previously released and redirected the UE, and (ii) based on the previous releasing and redirecting of the UE, the first network initiating a pre-registration of the UE with the second network to inform the second network that the UE is now reachable via the first network.

2. The method of claim 1, wherein the first network storing the information indicative of the releasing and redirecting of the UE comprises storing the information for a predefined period of time.

3. The method of claim 1, wherein the first network initiating the pre-registration of the UE with the second network comprises:
the first network initiating the pre-registration autonomously rather than in response to receipt from the UE of a request to register with the second network.

4. The method of claim 1, further comprising:
in response to the transition of the UE from being served by the first network to being served by the second network, the second network updating a record that the second network stores for the UE such that the record indicates that the UE is reachable directly via the second network.

5. The method of claim 4, wherein the first network initiating the pre-registration of the UE with the second network comprises:
the first network sending a signal to the second network to further update the record of the UE to inform the second network that the UE is now reachable via the first network.

6. The method of claim 1, wherein the first network releasing the UE is responsive to signaling indicating that the UE is seeking to transition from being served by the first network to being served by the second network.

7. The method of claim 1, wherein the first network is a Long Term Evolution (LTE) network, and wherein the second network is a fallback network.

8. The method of claim 7, wherein the fallback network is a Code Division Multiple Access (CDMA) network.

9. A method comprising:
a first network that is serving a user equipment device (UE) releasing the UE from being served by the first network and redirecting the UE to transition from being served by the first network to being served by a second network;
thereafter, the first network detecting that the UE has returned to be served by the first network; and
responsive to detecting the return of the UE, and based on the previous releasing and redirecting of the UE, the first network initiating a pre-registration of the UE with the second network to inform the second network that the UE is now reachable via the first network,
wherein the first network initiating the pre-registration of the UE with the second network comprises the first network transmitting a pre-registration request via an interworking server (IWS) configured to pass signaling between the first network and the second network.

10. A method comprising:
a first network that is serving a user equipment device (UE) releasing the UE from being served by the first network, redirecting the UE to transition from being served by the first network to being served by a second network, and storing information indicative of the releasing and redirecting of the UE;
thereafter, the first network detecting that the UE has returned to be served by the first network;
responsive to detecting the return of the UE, the first network referring to the stored information to determine that the first network previously released and redirected the UE; and
responsive to determining that the LTE previously released and redirected the UE, the first network autonomously initiating a pre-registration of the UE with the second network to inform the second network that the UE is now reachable via the first network.

11. The method of claim 10, wherein the first network storing the information indicative of the releasing and redirecting of the UE comprises storing the information for a predefined period of time.

12. The method of claim 10, wherein the first network initiating the pre-registration of the UE with the second network comprises:
the first network initiating the pre-registration autonomously rather than in response to receipt from the UE of a request to register with the second network.

13. The method of claim 10, further comprising:
in response to the transition of the UE from being served by the first network to being served by the second network, the second network updating a record that the second network stores for the UE such that the record indicates that the UE is reachable directly via the second network.

14. The method of claim 13, wherein the first network initiating the pre-registration of the UE with the second network comprises:
the first network sending a signal to the second network to further update the record of the UE to inform the second network that the UE is now reachable via the first network.

15. A communication system comprising:
a first network; and
a second network,
wherein the first network is configured to: (i) serve a user equipment device (UE), (ii) release the UE from being served by the first network and redirect the UE to transition from being served by the first network to being served by a second network, (iii) thereafter, detect that the UE has returned to be served by the first network, and (iv) responsive to detecting the return of the UE, and based on the previous releasing and redirecting of the UE, autonomously initiate a pre-registration of the UE with the second network to inform the second network that the UE is now reachable via the first network, and
wherein the second network is configured to: (i) receive signaling from the UE upon the releasing and redirecting of the UE, (ii) responsive to receiving the signaling, update a record stored at the second network for the UE to indicate that the UE is reachable directly via the second network, (iii) thereafter, receive a pre-registration request, and (iv) responsive to the pre-registration request, update the record of the UE to indicate that the UE is now reachable via the first network.

16. The communication system of claim 15, wherein the first network is a Long Term Evolution (LTE) network, and wherein the second network is a fallback network.

17. The communication system of claim 15, further comprising an interworking server (IWS) configured to pass signaling between the first network and the second network, wherein the first network is further configured to transmit a pre-registration request via the IWS to initiate the pre-registration of the UE with the second network.

18. The communication system of claim 15, wherein the first network is configured to release the UE responsive to signaling indicating that the UE is seeking to transition from being served by the first network to being served by the second network.

19. The communication system of claim 15, wherein, to initiate the pre-registration of the UE with the second network, the first network is configured to send a signal to the second network to further update the record of the UE to inform the second network that the UE is now reachable via the first network.

* * * * *